(12) United States Patent
Li et al.

(10) Patent No.: US 9,181,448 B2
(45) Date of Patent: Nov. 10, 2015

(54) LATEX EMULSIONS AND COATING COMPOSITIONS FORMED FROM LATEX EMULSIONS

(75) Inventors: Cathy Li, Solon, OH (US); Tiffany Weidendorf, Parma, OH (US); Timothy I. Memmer, Strongsville, OH (US); Daniel Bode, Cleveland, OH (US)

(73) Assignee: AKZO NOBEL COATINGS INTERNATIONAL B.V., Arnhem (NL)

( * ) Notice: Subject to any disclaimer, the term of this patent is extended or adjusted under 35 U.S.C. 154(b) by 0 days.

(21) Appl. No.: 13/996,600

(22) PCT Filed: Dec. 28, 2011

(86) PCT No.: PCT/EP2011/074118
§ 371 (c)(1),
(2), (4) Date: Jun. 21, 2013

(87) PCT Pub. No.: WO2012/089747
PCT Pub. Date: Jul. 5, 2012

(65) Prior Publication Data
US 2013/0281574 A1    Oct. 24, 2013

Related U.S. Application Data

(60) Provisional application No. 61/427,972, filed on Dec. 29, 2010.

(30) Foreign Application Priority Data

Feb. 10, 2011 (EP) ..................................... 11154059

(51) Int. Cl.
| | | |
|---|---|---|
| C09D 151/00 | (2006.01) | |
| C08F 6/14 | (2006.01) | |
| C08F 2/00 | (2006.01) | |
| C08F 2/22 | (2006.01) | |
| C09D 133/06 | (2006.01) | |
| B65D 25/14 | (2006.01) | |
| C09D 133/04 | (2006.01) | |
| C09D 5/20 | (2006.01) | |
| C08F 265/06 | (2006.01) | |

(52) U.S. Cl.
CPC .............. C09D 133/04 (2013.01); B65D 25/14 (2013.01); C08F 2/001 (2013.01); C08F 2/22 (2013.01); C08F 265/06 (2013.01); C09D 5/20 (2013.01); C09D 133/062 (2013.01); C09D 133/068 (2013.01); C09D 151/003 (2013.01)

(58) Field of Classification Search
CPC .... C09D 133/04; C09D 5/20; C09D 133/062; C08F 2/001; C08F 2/22; C08F 265/06

USPC ................... 524/453, 458; 523/201; 525/902; 526/201, 225
See application file for complete search history.

(56) References Cited

U.S. PATENT DOCUMENTS

| | | | |
|---|---|---|---|
| 4,306,040 A * | 12/1981 | Baer .............................. | 525/310 |
| 4,567,246 A | 1/1986 | Gajria et al. | |
| 4,906,684 A | 3/1990 | Say | |
| 7,189,787 B2 | 3/2007 | O'Brien et al. | |
| 2002/0161108 A1 | 10/2002 | Schultz et al. | |
| 2005/0196629 A1 | 9/2005 | Bariatinsky et al. | |
| 2005/0282957 A1 | 12/2005 | Parker et al. | |
| 2006/0100366 A1 | 5/2006 | O'Brien et al. | |
| 2007/0117928 A1 | 5/2007 | O'Brien et al. | |
| 2007/0281179 A1 | 12/2007 | Ambrose et al. | |
| 2011/0288232 A1* | 11/2011 | Rademacher et al. ........ | 524/745 |

FOREIGN PATENT DOCUMENTS

| | | |
|---|---|---|
| CN | 101029110 A | 9/2007 |
| CN | 101415788 A | 4/2009 |
| EP | 2 033 992 A2 | 3/2009 |
| SU | 653266 A1 | 3/1979 |
| WO | WO 00/49072 A1 | 8/2000 |
| WO | WO 02/064691 A2 | 8/2002 |
| WO | WO 2007/123659 A1 | 11/2007 |
| WO | WO 2007/138111 A1 | 12/2007 |
| WO | WO 2008/036629 A2 | 3/2008 |
| WO | WO 2010/097353 A1 | 9/2010 |
| WO | WO 2011/009024 A1 | 1/2011 |

OTHER PUBLICATIONS

English abstract of SU 653266 A1 published Mar. 25, 1979.

* cited by examiner

*Primary Examiner* — Kelechi Egwim

(57) ABSTRACT

Latex emulsions are disclosed which can be used in the formation of coating compositions that are not water sensitive, have good blush resistance and retortability. In some embodiments, the coating compositions are used to coat substrates such as cans and packaging materials for the storage of food and beverages. Coating compositions of the invention may be prepared by polymerizing at least one ethylenically unsaturated monomer component, a stabilizer comprising a strong acid and an initiator in a carrier to form an emulsion, polymerizing the emulsion with at least one different ethylenically unsaturated monomer component to prepare the composite latex emulsion, and reacting the composite latex emulsion with a neutralizer to form the coating composition. Methods of coating substrates with the coating compositions, and substrates coated with the coating compositions are also disclosed.

23 Claims, No Drawings

LATEX EMULSIONS AND COATING COMPOSITIONS FORMED FROM LATEX EMULSIONS

This application is the U.S. National Phase of PCT/EP2011/074118 filed on Dec. 28, 2011 and claims the benefit of U.S. Provisional Application No. 61/427,972 filed on Dec. 29, 2010 and European Application No. 11154059.7 filed on Feb. 10, 2011, the entire contents of each of which are incorporated herein by reference.

BACKGROUND OF THE INVENTION

1. Field of the Invention

The present invention relates to latex emulsions, coating compositions formed from latex emulsions, methods of coating substrates with the coating compositions, and substrates coated with the coating compositions.

2. Description of Related Art

Coating compositions formed from epoxy resins have been used to coat packaging and containers for foods and beverages. Although the weight of scientific evidence, as interpreted by the major global regulatory food safety agencies in the US, Canada, Europe, and Japan, shows that the levels of bisphenol A consumers are exposed to with current commercial epoxy based coatings is safe, some consumers and brand owners continue to express concern, and a coating that does not contain bisphenol A or any other endocrine disruptor is desirable.

International Publication No. WO 2008/036629 discloses a coating composition for food and beverage containers composed of a grafted polyester-acrylate resin that is crosslinked with a phenolic crosslinker and catalyzed by a titanium-containing or zirconium-containing catalyst.

U.S. Patent Application Publication No. 2005/0196629 also discloses a coating composition for food and beverage containers composed of a grafted polyester-acrylate resin that is crosslinked with a phenolic crosslinker.

U.S. Patent Application Publication No. 2006/0100366 uses an acrylic polymer as a dispersant for latex polymerization by combining an ethylenically unsaturated monomer component with a dispersion of a salt of an acid- or anhydride-functional polymer and an amine to form an emulsion.

U.S. Patent Application Publication No. 2007/0117928 and U.S. Pat. No. 7,189,787 disclose the formation of a dispersion which is the reaction product of a tertiary amine with an acid functional polymer and a glycidyl functional polymer.

International Publication No. WO 2007/123659 discloses a coating composition formed by crosslinking an acrylic polymer having a molecular weight greater than 41,000 and an acid value less than 30 mg KOH/g.

U.S. Patent Application Publication No. 2007/0281179 discloses a coating composition having a polyester which is the reaction product of a polyol and a bis-epoxy reacted with a mono- and/or di-phenolic carboxylic acid and/or ester.

Latexes made by emulsion polymerization have not achieved the performance of epoxy based coatings and have not been successfully used on a commercial basis in food and beverage coating compositions. Some drawbacks have been flavor acceptance in beer and blush performance in pasteurized or retorted hard-to-hold beverages. Typical latex emulsion polymers use sodium salts as buffers and stabilizers, and/or non ionic surfactants which also impart an unacceptable degree of sensitivity to water (blushing).

There is a need to produce coating compositions that do not contain bisphenol A or are substantially free of bisphenol A. The latex emulsions of the invention can be used in the preparation of coating compositions suitable, inter alia, as packaging coatings for food and beverage packaging and containers, including beer and beverage external/interior easy-open-ends. Easy-open-ends for beer and beverage cans are typically manufactured by first coating a flat sheet of a metal substrate, heating the coated substrate, and then stamping or shaping the coated substrate into the desired shape. The coatings for beer and beverage can ends may be applied in film weights of about 1 milligram per square inch to about 15 milligrams per square inch on a high speed coil coating line. High speed coil coating lines require a coating material that will dry and cure within a few second as it is heated very rapidly to a peak metal temperature that can range from about 200 to about 300° C.

SUMMARY OF THE INVENTION

The present invention provides an alternate to epoxy resins that still allows formaldehyde free cure, blush resistance, capability to retort and can withstand hard-to-hold beverages. The coating compositions of the invention can be made with a simple process, not requiring multiple polymers or processing stages to achieve the intended effect.

The present invention includes methods for preparing composite latex emulsions. In some embodiments of the invention, a composite latex emulsion is prepared by a method comprising the steps of polymerizing at least one ethylenically unsaturated monomer component, a stabilizer comprising a strong acid and an initiator in a carrier to form an emulsion, and polymerizing the emulsion with at least one different ethylenically unsaturated monomer component to prepare the composite latex emulsion.

In some embodiments of the invention, a composite latex emulsion is used in the formation of a coating composition for food and beverage packaging and containers. The coating compositions may be prepared by a method comprising the steps of preparing a composite latex emulsion by a method comprising the steps of polymerizing at least one ethylenically unsaturated monomer component, a stabilizer comprising a strong acid and an initiator in a carrier to form an emulsion, polymerizing the emulsion with at least one different ethylenically unsaturated monomer component to prepare the composite latex emulsion, and reacting the composite latex emulsion with a neutralizer to form the coating composition. In some embodiments, a stabilizer is present in an amount from about 0.1% to about 5.0% by weight polymeric solids. The coating compositions may exhibit no or minimal blush, no or minimal color pick-up, commercially acceptable adhesion, and can be used to provide sufficient coating, adhesion and flexibility during beer and beverage easy-open-end fabrication.

In some embodiments of the invention, a method of coating a substrate is disclosed comprising the steps of preparing a composite latex emulsion by a method comprising the steps of polymerizing at least one ethylenically unsaturated monomer component, a stabilizer comprising a strong acid and an initiator in a carrier to form an emulsion, polymerizing the emulsion with at least one different ethylenically unsaturated monomer component to prepare the composite latex emulsion, reacting the composite latex emulsion with a neutralizer to form a coating composition, and applying the coating composition to the substrate. In some embodiments, a stabilizer is present in an amount from about 0.1% to about 5.0% by weight polymeric solids. In some embodiments, the substrate is a can or packaging.

Substrates coated with the coating compositions of the invention are also disclosed. In some embodiments, the substrate is a can or packaging.

DETAILED DESCRIPTION OF THE INVENTION

The present invention includes substrates coated at least in part with a coating composition of the invention and methods for coating the substrates. The term "substrate" as used herein includes, without limitation, cans, metal (such as aluminum) cans, beer and beverage easy-open-ends, packaging, containers, receptacles, or any portions thereof used to hold, touch or contact any type of food or beverage. Also, the terms "substrate", "food can(s)", "food containers" and the like include, for non-limiting example, "can ends", which can be stamped from can end stock and used in the packaging of beverages.

The present invention includes methods for preparing a composite latex emulsion by polymerizing at least one ethylenically unsaturated monomer component, a stabilizer comprising a strong acid and an initiator in a carrier to form an emulsion, and polymerizing the emulsion with at least one different ethylenically unsaturated monomer component to prepare the composite latex emulsion. In some embodiments, a stabilizer is present in an amount of about 0.1% to about 5.0% by weight polymeric solids. In some embodiments, the composite latex emulsion is reacted with a neutralizer to form a coating composition for food and beverage packaging and containers.

The composite latex emulsions of the present invention may comprise a relatively homogenous latex particle structure and/or an inhomogeneous latex particle structure. The composite latex particle structure may be controlled by the polymerization processes, including for non-limiting example a multi-stage polymerization process. Such particle structures are usually prepared by a series of consecutive emulsion polymerization sequences with different monomer types, where the second stage monomer is polymerized in the presence of seed latex particles. In some embodiments, the latex particle size has a strong influence on the film properties. For non-limiting example, large particle size latexes (greater than about 300 nm) may provide good oven blister resistance at high film weights (greater than about 7 milligrams per square inch) at short film-forming times, such as when the latexes are used as coating compositions for beverage ends applications with a curing time less than about 10 seconds. Large particle size latexes can be synthesized using high critical micelle concentration surfactants (such as without limitation Aerosol MA-80-I, Bisomer PEM6 LD and combinations thereof) at the seed stage. The solids content of large particle size latexes may be high in some embodiments because the distance between the particles generally increases as the particle size increases, thus, a high solids content (greater than about 50%) can be achieved. The high solids content is useful for interior easy-open-end applications. In some embodiments, the coating composition has a gel content greater than about 35.

The composite latex particle structures of the invention allow for the incorporation of lower levels of acid monomers which contributes to better blush resistance and acceptable adhesion on the substrate. Lower levels of acid monomers, such as amounts of about 0.5% to about 10%, or about 1.2% to about 5%, may contribute to rheology at higher solids applications for reverse roll coating onto a coil. In some embodiments, the composite latex particles comprise core-shell latex particles. The cores of the composite latex particles may have up to about 3.0% of a monomer, such as without limitation, a hydroxyl group monomer, a carboxylic monomer or a combination thereof, while the shells of the composite latex particles may have about 0.5% to about 10% of a monomer, such as without limitation, a hydroxyl group monomer, a carboxylic monomer or a combination thereof. An increased number of functional groups in the core and an increased functionality in the shell may contribute to good wetting and adhesion on the substrate. A decreased number of functional groups in the core may provide good water blush resistance. A high content of functional monomers in the ethylenically unsaturated monomer component, such as without limitation hydroxypropyl (meth)acrylate, (meth)acrylic acid or a combination thereof, may produce a composite latex emulsion having poor water blush resistance after very short baking (only about 9 seconds).

The composite latex emulsions used in the present invention are prepared in some embodiments by techniques known in the art, such as without limitation, suspension polymerization, interfacial polymerization, and emulsion polymerization. Emulsion polymerization techniques for preparing latex emulsions from ethylenically unsaturated monomer components are well known in the polymer arts, and any conventional latex emulsion technique can be used, such as for non-limiting example, single and multiple shot batch processes, and continuous processes. In some embodiments, an ethylenically unsaturated monomer component (which may include and/or function as a crosslinker) is prepared and added in different stages to the polymerization vessel. The order of monomer addition (such as hydroxyl and acid monomers) may be in the order from most hydrophobic to most hydrophilic, which can help to increase retort resistance, stabilize the latex particles and provide good wetting and adhesion on coated substrates. The ethylenically unsaturated monomer component which may include and/or function as a crosslinker (such as glycidyl methacrylate, glycerol dimethacrylate, 1,4-butanediol dimethacrylate, or a combination thereof) may be added in the order from less crosslinked to most crosslinked in order to increase mechanic properties of the film and abrasion resistance. The ethylenically unsaturated monomer component composition within the polymerization vessel may be varied during the course of the polymerization, such as, for non-limiting example, by altering the composition of the ethylenically unsaturated monomer component being fed into the vessel. Both single and multiple stage polymerization techniques can be used. In some embodiments, the composite latex emulsions are prepared using a seed polymer emulsion to control the number and the size of particles produced by emulsion polymerization. The particle size of the composite latex emulsion polymer particles is controlled in some embodiments by adjusting the initial surfactant charge.

There are at least several different ways to crosslink the composite latex emulsion in order to raise the molecular weight. In one embodiment, the composite latex emulsion can be crosslinked by at least one ethylenically unsaturated monomer component such as tripropylene glycol di(meth)acrylate, diethylene glycol di(meth)acrylate, ethyl glycol di(meth)acrylate, 1,6-hexanediol di(meth)acrylate, glycerol di(meth)acrylate, or a combination thereof. In another embodiment, if the composite latex emulsion has functional groups, such as methacrylate acid, the composite latex emulsion can be crosslinked by glycidyl groups, such as without limitation glycidyl methacrylate. In a third embodiment, if the composite latex emulsion has hydroxyl functional group monomers, such as without limitation hydroxypropyl methacrylate, the composite latex emulsion can be crosslinked with a phenolic resin to achieve suitable physical properties of the cured coating on the substrate. Suitable crosslinkers can include, but are not limited to, urea-formaldehyde, phenol-formaldehyde, benzoguanamine formaldehyde, phenolic resins, and combinations thereof. In some embodiments of the invention, the ethylenically unsaturated monomer component may include and/or function as the crosslinker. In addition, the crosslinker may be added as a component separate from the ethylenically unsaturated monomer component. In some embodiments, the amount of the crosslinker is about 0.1 to about 30 wt % based on the polymer solids content. The crosslinker may help improve chemical resistance and/or water blush resistance. However, if the amount of the crosslinker is too high, the film may lose flexibility.

The composite latex emulsion particle structures can be controlled by polymerization processes. The composite latex emulsion particles may be prepared by a series of consecutive emulsion polymerization sequences with different monomer types, where the second (third, etc.) stage monomer is polymerized in the presence of seed latex particles. These seed particles may be prepared in a separate step or formed in situ during the emulsion polymerization. The resulting latex emulsions may be referred to as composite latex emulsions, implying a particle structure with the initially polymerized polymer located at the core of the particle, and the later-formed polymers becoming incorporated into the shell.

The formation of a composite latex emulsion can meet a variety of molecular, functional and colloidal requirements. For example, the polymers in the core may have less functional monomers, such as without limitation hydroxyl group monomers, carboxylic acid monomers and combinations thereof. The hydroxyl group monomers and carboxylic monomers may be incorporated into the shell to help provide good wetting, suitable adhesion on a substrate and to help stabilize lubricants. In some embodiments, a hard polymer is present in the core and a soft polymer is present in the shell which may help reduce the minimum film formation temperature. The composite latex emulsion particle size may also have an influence on the film properties. For non-limiting example, large particle size composite latex emulsions (greater than about 300 nm) may provide good oven blister resistance at high film weights (greater than about 7 milligrams per square inch) at short film-forming times. The large particle size composite latex emulsions can be synthesized using high critical micelle concentration surfactants (such as without limitation Aerosol MA-80-I from Cytec, Bisomer PEM6 LD from Cognis, and combinations thereof). In some embodiments, Aerosol MA-80-I is used at the seed stage to help prevent poor water blush resistance. The solids content of large particle size composite latex emulsions may be high because the distance between the particles increases as the particle size increases, thus the achievable solids content increases. A high solids content may be desirable for interior easy-open end applications to achieve a high film weight.

The ethylenically unsaturated monomer component can be composed of a single monomer or a mixture of monomers in various embodiments of the invention. When the emulsion is polymerized with at least one different ethylenically unsaturated monomer component to prepare the composite latex emulsion, the at least one different ethylenically unsaturated monomer component may also be a monomer or mixture of monomers. In some embodiments, the ethylenically unsaturated monomer component may include and/or function as the crosslinker. In some embodiments, the ethylenically unsaturated monomer component and/or the different ethylenically unsaturated monomer component is present in an amount from about 2% to about 60% based on total mixture. The ethylenically unsaturated monomer component and the different ethylenically unsaturated monomer component may include, without limitation, one or more vinyl monomers, acrylic monomers, allylic monomers, acrylamide monomers, vinyl esters including without limitation, vinyl acetate, vinyl propionate, vinyl butyrates, vinyl benzoates, vinyl isopropyl acetates, and similar vinyl esters, vinyl halides including without limitation, vinyl chloride, vinyl fluoride and vinylidene chloride, vinyl aromatic hydrocarbons including without limitation, styrene, methyl styrenes and similar lower alkyl styrenes, chlorostyrene, vinyl toluene, vinyl naphthalene, vinyl aliphatic hydrocarbon monomers including without limitation, alpha olefins such as for non-limiting example, ethylene, propylene, isobutylene, and cyclohexene, as well as conjugated dienes such as for non-limiting example, 1,3-butadiene, methyl-2-butadiene, 1,3-piperylene, 2,3 dimethyl butadiene, isoprene, cyclohexane, cyclopentadiene, dicyclopentadiene, as well as combinations thereof. Vinyl alkyl ethers may include without limitation, methyl vinyl ether, isopropyl vinyl ether, n-butyl vinyl ether, isobutyl vinyl ether, and combinations thereof. Acrylic monomers may include without limitation, monomers such as for non-limiting example, lower alkyl esters of acrylic or methacrylic acid having an alkyl ester portion other than methyl or ethyl containing about 3 to about 10 carbon atoms, as well as aromatic derivatives of acrylic and methacrylic acid, and combinations thereof. Acrylic monomers may include, for non-limiting example, butyl acrylate and methacrylate, propyl acrylate and methacrylate, 2-ethyl hexyl acrylate and methacrylate, cyclohexyl acrylate and methacrylate, decyl acrylate and methacrylate, isodecylacrylate and methacrylate, benzyl acrylate and methacrylate, various glycidyl ethers reacted with acrylic and methacrylic acids, hydroxyl alkyl acrylates and methacrylates such as without limitation, hydroxyethyl and hydroxy propyl acrylates and methacrylates, and amino acrylates and methacrylates, as well as combinations thereof.

In some embodiments, the ethylenically unsaturated monomer component and/or the different ethylenically unsaturated monomer component include at least one multi-ethylenically unsaturated monomer component effective to raise the molecular weight and to help crosslink the polymer. Non-limiting examples of multi-ethylenically unsaturated monomer components include allyl (meth)acrylate, tripropylene glycol di(meth)acrylate, diethylene glycol di(meth)acrylate, ethylene glycol di(meth)acrylate, 1,6-hexanediol di(meth)acrylate, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, divinylnaphthalene, and combinations thereof. In some embodiments, the multi-ethylenically unsaturated monomer component is present in an amount from about 0.1 to about 5%.

In some embodiments of the invention, the ethylenically unsaturated monomer component and/or the different ethylenically unsaturated monomer component is mixed with a stabilizer comprising a strong acid in a carrier to form a monomer emulsion. Optionally, a base is present in the mixture. In some embodiments, the stabilizer is present in an amount from about 0.1% to 5.0% by weight polymeric solids.

Non-limiting examples of stabilizers include strong acids, such as without limitation, dodecylbenzene sulfonic acid, dinonylnaphthalene sulfonic acid, dinonylnaphthylenedisulfonic acid, bis(2-ethylhexyl)sulfosuccinic acid and the like, including combinations thereof. In some embodiments, a strong acid is an acid with a dissociation constant in aqueous solution, pK less than about 4. In some embodiments, the strong acid has a hydrophobe attached to the acid. In some embodiments, the strong acid has at least about six carbon atoms.

Non-limiting examples of a base include ammonia, dimethylethanolamine, 2-dimethylamino-2-methyl-1-propanol, and combinations thereof. In some embodiments, the base is present in an amount of about 50% to 100% mole to mole of stabilizer.

In some embodiments, the carrier includes, without limitation, water, a water soluble cosolvent, or a combination thereof. The carrier is present in an amount of about 50 to about 90% of the total latex emulsion in some embodiments.

In some embodiments of the invention, the monomer emulsion is reacted with one or more initiators. The initiator may include, for non-limiting example, an initiator which thermally decomposes at the polymerization temperature to generate free radicals. Examples of initiators include, without limitation, both water-soluble and water-insoluble species, as well as combinations thereof. Examples of free radical-generating initiators include, for non-limiting example, persulfates, such as without limitation, ammonium or alkali metal (potassium, sodium or lithium) persulfate, azo compounds such as without limitation, 2,2'-azo-bis(isobutyronitrile), 2,2'-azo-bis(2,4-dimethylvaleronitrile), and 1-t-butyl-azocyanocyclohexane), hydroperoxides such as without limitation, t-butyl hydroperoxide and cumene hydroperoxide, peroxides such as without limitation, benzoyl peroxide, caprylyl peroxide, di-t-butyl peroxide, ethyl 3,3'-di(t-butylperoxy)butyrate, ethyl 3,3'-di(t-amylperoxy)butyrate, t-amylperoxy-2-ethyl hexanoate, and t-butylperoxy pivilate, peresters such as without limitation, t-butyl peracetate, t-butyl perphthalate, and t-butyl perbenzoate, percarbonates, such as without limitation, di(1-cyano-1-methylethyl)peroxy dicarbonate, perphosphates, and the like, as well as combinations thereof.

In some embodiments, the initiator is used alone or as the oxidizing component of a redox system, which may include, without limitation, a reducing component such as, for non-limiting example, ascorbic acid, maleic acid, glycolic acid, oxalic acid, lactic acid, thioglycolic acid, or an alkali metal sulfite, such as without limitation, a hydrosulfite, hyposulfite or metabisulfite, such as without limitation, sodium hydrosulfite, potassium hyposulfite and potassium metabisulfite, or sodium formaldehyde sulfoxylate, as well as combinations thereof. The reducing component can be referred to as an accelerator or a catalyst activator.

The initiator and accelerator, which can be referred to as an initiator system, may be used in some embodiments in proportions from about 0.001% to about 5% based on the weight of ethylenically unsaturated monomer component to be copolymerized. Promoters such as without limitation, chloride and sulfate salts of cobalt, iron, nickel or copper are optionally employed in amounts from about 2 to about 200 ppm in some embodiments. Non-limiting example of redox catalyst systems include, without limitation, tert-butyl hydroperoxide/sodium formaldehyde sulfoxylate/Fe(II), ammonium persulfate/sodium bisulfite/sodium hydrosulfite/Fe(II), and combinations thereof. In some embodiments, the polymerization temperature is from about room temperature to about 90° C., and the temperature can be optimized for the initiator system employed, as is conventional.

In some embodiments of the invention, aggregation of polymeric latex particles may be limited by including a stabilizing surfactant during polymerization. For non-limiting example, the growing latex particles may be stabilized during emulsion polymerization by one or more surfactants such as, without limitation, dodecylbenzene sulfonic acid, an anionic or nonionic surfactant, or a combination thereof. Other types of stabilizing agents can be used in some embodiments, such as without limitation, protective colloids. Generally speaking, conventional anionic surfactants with metal, nonionic surfactants containing polyethylene chains and other protective colloids tend to impart water sensitivity to the resulting films. In some embodiments of the invention, it is desirable to minimize or avoid the use of these conventional anionic and nonionic surfactants. In some embodiments, the stabilizing surfactant is employed during seed polymerization.

Chain transfer agents are used in some embodiments of the invention to help control the molecular weight of the latex emulsion. Non-limiting examples of chain transfer agents include mercaptans, polymercaptans, polyhalogen compounds, alkyl mercaptans such as without limitation, ethyl mercaptan, n-propyl mercaptan, n-butyl mercaptan, isobutyl mercaptan, t-butyl mercaptan, n-amyl mercaptan, isoamyl mercaptan, t-amyl mercaptan, n-hexyl mercaptan, cyclohexyl mercaptan, n-octyl mercaptan, n-decyl mercaptan, n-dodecyl mercaptan, mercapto carboxylic acids and their esters, such as without limitation, methyl mercaptopropionate and 3-mercaptopropionic acid, alcohols such as without limitation, isopropanol, isobutanol, lauryl alcohol and t-octyl alcohol, halogenated compounds such as without limitation, carbon tetrachloride, tetrachloroethylene, tricholoro-bromoethane, and combinations thereof. In some embodiments, up to about 10% by weight of a chain transfer agent is used, based on the weight of the ethylenically unsaturated monomer component mixture. The composite latex emulsion molecular weight may be controlled in some embodiments by controlling the ratio of initiator to the ethylenically unsaturated monomer component.

In some embodiments, the initiator system and/or chain transfer agent is dissolved or dispersed in separate fluid mediums or in the same fluid medium, and then gradually added to the polymerization vessel. In some embodiments, the ethylenically unsaturated monomer component (either neat or dissolved or dispersed in a fluid medium) is added simultaneously with the catalyst and/or the chain transfer agent. The catalyst may be added to the polymerization mixture to "chase" residual monomer after polymerization has been substantially completed to polymerize the residual monomer.

In some embodiments, an additional monomer mixture of an ethylenically unsaturated monomer component and a stabilizer is added to the monomer emulsion. Optionally, a base is present in the additional monomer mixture. The additional monomer mixture can be added to the monomer emulsion in some embodiments prior to addition of the initiator, after addition of the initiator, or both before and after addition of the initiator. The compositions of the ethylenically unsaturated monomer component, stabilizer and base in the additional monomer mixture can be the same as or different than the compositions of these components in the monomer emulsion.

The composite latex emulsion is reacted with a neutralizer in some embodiments of the invention to form a coating composition. In some embodiments, the reaction occurs in the presence of a solvent and a phenolic crosslinker, such as without limitation Sakuranomiya Chemical Company's MC-16, Cytec's EP-560, PH2028, PH2013/65B, PR899/60 MPC, Hexion's PF6535LB, SI Group's SFC112/65, Ruters's 7700 LB, or a combination thereof. Solvents may include without limitation xylene, benzene, ethyl benzene, toluene, alkoxy alkanols, methanol, ethanol, propanol, butanol, alkyl ethers of ethylene, alkyl ethers of propylene glycol, ethylene glycol monobutyl ether, ethylene glycol ethyl ether, diethylene glycol monobutyl ether, a ketone, an aromatic solvent, an ester solvent, a hydroxyl functional solvent, and combinations thereof. The amount of the solvent in the coating composition may be up to about 90% by weight of the polymeric solids, or from about 20% to about 45% by weight of the liquid coating composition. If water is present, the amount of water in the coating composition may range from about 20% to about 50%.

In some embodiments, the neutralizer includes, without limitation, ammonia, a tertiary amine, such as, for non-limiting example, dimethylethanolamine, 2-dimethylamino-2-methyl-1-propanol, tributylamine, or a combination thereof. For non-limiting example, the neutralizer may be employed in an amount up to about 100% based on of the amount of acid to be neutralized in the system.

The glass transition temperature (Tg) of the composition may depend on the total monomer composition and may contribute to blush resistance, lube bloom and abrasion resistance. For non-limiting example, if the polymer has increased amounts of methacrylic acid, then the polymer may have a higher Tg. In some embodiments of the invention, the Tg is from about 10° C. to about 50° C. If the Tg is too low, the film may be too soft and may have insufficient abrasion resistance. If the Tg is too high, the film may wrinkle and may not have enough flexibility which may decrease film performance. The cure temperature may be about 200 to about 300° C.

The composite latex emulsions and the coating compositions of the invention can include conventional additives known to those skilled in the art, such as without limitation, additives to control foam, reduce equilibrium and dynamic surface tension, or to control rheology and surface lubricity. Amounts can vary depending on desired coating application and performance in any manner known to those skilled in the art.

One or more coating compositions of the invention may be applied to a substrate in some embodiments, such as for non-limiting example, cans, metal cans, beer and beverage easy-open-ends, packaging, containers, receptacles, can ends, or any portions thereof used to hold or touch any type of food or beverage. In some embodiments, one or more coating compositions are applied in addition to the coating composition of the present invention, such as for non-limiting example, a prime coat may be applied between the substrate and a coating composition of the present invention.

The coating compositions can be applied to substrates in any manner known to those skilled in the art. In some embodiments, the coating compositions are sprayed onto a substrate. When spraying, the coating composition may contain, for non-limiting example, from about 10% to about 30% by weight of the polymeric solids relative to about 70% to about 90% water including other volatiles such as, without limitation, minimal amounts of solvents, if desired. For some applications, typically those other than spraying, the aqueous polymeric dispersions may contain, for non-limiting example, from about 20% to about 60% by weight of the polymer solids. Organic solvents may be utilized in some embodiments to facilitate spray or other application methods and such solvents may include, without limitation, n-butanol, 2-butoxy-ethanol-1, xylene, toluene, and mixtures thereof. In some embodiments, n-butanol is used in combination with 2-butoxy-ethanol-1. The coating compositions of the present invention may be pigmented and/or opacified with known pigments and opacifiers in some embodiments. For many uses, including food use for non-limiting example, the pigment may be titanium dioxide. The resulting aqueous coating compositions may be applied in some embodiments by conventional methods known in the coating industry. Thus, for non-limiting example, spraying, rolling, dipping, and flow coating application methods can be used for both clear and pigmented films. In some embodiments, after application onto a substrate, the coating may be cured thermally at temperatures in the range from about 215° C. to about 250° C., and alternatively higher for a time sufficient to effect complete curing as well as volatilizing any fugitive components therein.

For substrates intended as beverage containers, the coating compositions may be applied in some embodiments at a rate in the range from about 0.5 to about 15 milligrams per square inch of polymer coating per square inch of exposed substrate surface. In some embodiments, the water-dispersible coating composition may be applied at a thickness from about 1 to about 25 microns.

Compared to conventional epoxy-acrylic commercial materials, the present invention offers simplicity of manufacture such that one single polymer may be used in an emulsion polymerization process. It was surprising that desired properties could be achieved without styrene or other vinyl monomers. One unique aspect of the invention is that the crosslinkers can be used in the coating compositions to contribute to coating films having acceptable blush resistance and water retort resistance. Additional phenolic resins or crosslinkers can be blended into the composite latex emulsions to enhance film properties. The resulting coating compositions may provide acceptable toughness, abrasion resistance and flexibility. The present invention may also provide very good blush resistance and retort resistance. Coating compositions of the present invention have been applied on panels and during fabrication of beverage easy-open-ends and test results on such ends were similar to current commercial epoxy controls. The water retort, Dowfax, and Joy tests were all similar to current epoxy controls with little or no adhesion loss and little or no trace blush.

One of the unique aspects of the present invention is the ability to control the composite latex emulsion particle structures. The composite latex emulsion particles allow the incorporation of functional monomers and crosslinkers in the shell to help enhance film formation, wetting, adhesion on coated substrates and mechanic properties. In addition, large size composite latex emulsion particles may provide improved oven blister resistance.

For substrates intended as beverage easy-open-ends, the coating are applied in some embodiments at a rate in the range from about 1.5 to about 15 milligrams of polymer coating per square inch of exposed substrate surface. Conventional packaging coating compositions are applied to metal at about 232 to about 247° C. Some of the coating compositions of the current invention achieve good results at about 230° C. or below, such as at about 210° C. or below. This decreased temperature provides an energy savings to the coater, and it may allow the use of different alloys, such as tin-plated steel used for easy-open-ends. This also allows to recycle the ends together with the can body. When used as a coating for the easy-open-end of a metal container, the coatings of the invention exhibit resistance to retorted beverages, acidified coffees, isotonic drinks, and the like. In some embodiments, the solids content of the coating composition is greater than about 30% and the coating composition has the viscosity from about 35 to about 200 centipoise at 30% solids or above produces a film weight of about 6 to about 8 msi (milligrams per square inch) so that over blister is minimized and so that the film can have good chemical resistance, such as aluminum pick-up resistance. Some of the coating compositions of the current invention can be used for both inside and outside easy-open-end applications.

EXAMPLES

The invention will be further described by reference to the following non-limiting examples. It should be understood that variations and modifications of these examples can be made by those skilled in the art without departing from the spirit and scope of the invention.

Gel content was measured as follows:

1. The sample was placed in a PTFE 10 cc centrifuge tube, and 10 cc's of unstabilized THF was added. Both the tube and the sample weights were known.

2. The sample solution solubilized overnight, and the following day it was supercentrifuged for 5 hours at 20,000 rpm using a Beckman-Coulter (Avanti J-E).

3. As quickly as possible after the end of the supercentrifugation step, the tubes were removed and the gel 'type' was observed. The gels were moveable and difficult to see clearly (not well-pelletized). Since the materials either did not pelletize well or were partially pelletized, it was recognized that there needed to be a balance between removing as much supernate as possible without also removing the gel. About 8.5 to about 9.5 cc of supernate was pipetted off, leaving some supernate containing soluble material behind.

4. The 'pipetted' supernate was filtered through a 0.45 μm syringe filter prior to GPC analysis.

5. The PTFE tube with insoluble material was dried overnight in a hood, and then heated under vacuum the following day for 4-5 hours at 62° C. to drive off any residual THF.

6. The dried insolubles and the tube weight was taken and the weight of the tube itself was subtracted.

% Gel Content Calculation:

(Weight of Insolubles(g)×100)/(Sample weight(g)× NV)=% Gel Content

Blush resistance measures the ability of a coating to resist attack by various solutions. Typically, blush is measured by the amount of water absorbed into a coated film. When the film absorbs water, it generally becomes cloudy or looks white. The coating compositions were evaluated with deionized water retort (90 minutes immersed into water at 250° F.). Retort blush was measured visually on a scale of 0-5. A blush of 0 means that there is no blush. A blush of 5 means that the film is completely white.

Solvent resistance is measured as a resistance to solvents, such as methyl ethyl ketone (MEK) or acetone. This test was performed as described in ASTM D 5402-93. The numbers of double-rubs (i.e. one back-and forth motion) is reported. MEK was used in the current tests.

Beaded Ericksen cup fabrication measures the ability of a coated substrate to retain its integrity as it simulated the formation process to produce a beverage can end. It is a measure of the presence of cracks or fractures in the beads. 1×1 inch drown cups were made by Ericksen Cupper.

Adhesion testing was performed on the beaded Ericksen cups to assess whether the coating adheres to the cups. The adhesion test was performed according to ASTM D 3359-Test Method B, using SCOTCH 610 tape, available from 3M Company of Saint Paul, Minn. Adhesion is generally rated on a scale of 0-5 where a rating of "0" indicated no adhesion failure, a rating of "5" indicates that film was completely off the substrate.

Blisters were measured by MEUI Techno Microscopes and referenced by ASTM D714. The blisters were rated by none, a few and dense in this application.

Water blush was measured by the amount of water absorbed into the coated film when the film was immersed into water. Water vapor blush was measured. The coating compositions were evaluated with deionized water retort (90 minutes immersed into water at 250° F.). Retort blush was measured using a Waco Enamel Rater. Coated can ends were placed on the Waco Enamel Rater to test the coverage of the coating on beverage cans. This test displays an index of the amount of metal exposed by incomplete enamel coverage on a clear, easily-readable digital LED. When the can is inverted, the electrode and can-end become immersed in the electrolyte and the reading is displayed on the Enamel Rater.

Copper chloride resistance was used to measure the ability of the coated substrate after water retort to retain its integrity as it undergoes a formation process to produce a beverage can-end. In this test, the fabricated can ends were exposed to a copper chloride solution. Copper will deposit in any creaks or fractures that may exist in the end. A copper sulfate testing solution was prepared with 2070 grams of water, 600 grams of copper sulfate, 300 grams of hydrochloric acid and 30 grams of Dowfax 2A1. The copper sulfate was dissolved in the distilled water in a 4000 ml beaker, then the hydrochloric acid and Dowfax 2A1 were added. The testing procedure was: (1) fill the tray to a depth of ½ inch with the copper sulfate solution; (2) float the ends with the interior side down on the solution; (3) set the timer for 30 minutes; and (4) after 30 minutes has elapsed, remove the ends and dip into a container of tap water. Blush was measured visually using on a scale of 0-5. A blush of 0 means that there was no copper chloride stain at the end. A blush of 5 means that the film was completely stained by copper chloride.

A 2% citric acid test was used to simulate an acidic beverage. The can-ends were immersed into the 2% citric acid solution for 60 minutes at 250° F. Retort blush was measured using a Waco Enamel Rater. Coated can ends were placed on the Waco Enamel Rater to test the coverage of the coating on beverage cans.

Acidified Coffee solutions were prepared using 30 grams of Maxwell's coffee and 4875 grams of water. The beverage ends were immersed into the acidified coffee solution for 60 minutes at 250° F. After immersion, the can-ends were evaluated using the Waco Enamel Rater. Stain was measured showing how much coffee was deposited on the ends. Stain was measured visually using on a scale of 0-5. A scale of 0 means that there was no coffee stain at the end. A scale of 5 means that the film was completely stained by coffee.

Example 1

A latex was prepared by a composite polymerization process using a glycidyl methacrylate crosslinker. Group F was the core polymer which had less functional monomers compared to the shell. Group G was the shell polymer which had more functional monomers compared to the core.

| Acrylate latex with glycidyl methacrylate | Weight |
| --- | --- |
| A) Deionized water | 1024.1 g |
| B) Dodecylbenzene sulfonic acid (DDBSA) | 1.2 g |
| B) Deionized water | 9.8 g |
| B) Ammonium hydroxide (28%) | 0.1 g |
| C) Methyl methacrylate (MMA) | 24.5 g |
| C) Butyl acrylate (BA) | 19.6 g |
| D) Ammonia persulfate | 4.9 g |
| D) Deionized water | 14.7 g |
| E) Dodecylbenzene sulfonic acid | 3.1 g |
| E) Deionized water | 88.2 g |
| E) Ammonium hydroxide (28%) | 0.5 g |
| F) Methyl methacrylate (MMA) | 243.0 g |
| F) Butyl acrylate (BA) | 215.6 g |
| F) Hydroxypropyl methacrylate (HPMA) | 4.9 g |
| F) Methacrylic acid (MAA) | 2.0 g |
| G) Methyl methacrylate (MMA) | 196.0 g |
| G) Butyl acrylate | 186.2 g |
| G) Glycidyl methacrylate (GMA) | 58.8 g |
| G) Hydroxypropyl methacrylate | 19.6 g |
| G) Methacrylic acid | 9.8 g |
| H) Deionized water | 34.3 g |
| I) Ascorbic acid | 1.0 g |
| I) Deionized water | 9.8 g |
| I) Iron (II) sulfate | 0.00001 g |
| J) t-butyl perbenzoate | 2.5 g |
| J) Deionized water | 9.8 g |
| K) Dimethyl ethanolamine | 4.9 g |
| K) Deionized water | 49 g |

Group A and B were charged into a flask and heated to 80° C. under a nitrogen sparge. Agitation was turned on. The nitrogen sparge was turned off at 75° C. and Group C was added. Next, Group D was added to the flask at 80° C. and held for 15 minutes. Next, Group E was fed over 180 minutes. Next, Group F was fed over 90 minutes at 80° C. Next, Group G was fed over 90 minutes at 80° C. When Group E and Group G were added, the batch was held for 15 minutes. Group H rinsed the pump and pumped the mixture into the reactor. Next, Group I was added and held for 5 minutes. Group J was then added and held for 60 minutes at 80° C. The reactor was then cooled to 40° C. Next, Group K was pumped into the reactor over 30 minutes at 40° C.

This latex needed an amine to stabilize. The latex particle size was 133 nm and gel content was 76%. The solids content was 44.3%.

Example 2

A latex was prepared by a composite polymerization process using a glycidyl methacrylate crosslinker. Group F was the core polymer which had less functional monomers compared to the shell. Group G was the shell polymer which had more functional monomers compared to the core. Example 2 had a higher Tg compared to Example 1.

| Acrylate latex with glycidyl methacrylate | Weight |
| --- | --- |
| A) Deionized water | 1024.1 g |
| B) Dodecylbenzene sulfonic acid (DDBSA) | 1.2 g |
| B) Deionized water | 9.8 g |
| B) Ammonium hydroxide (28%) | 0.1 g |
| C) Methyl methacrylate (MMA) | 24.5 g |
| C) Butyl acrylate (BA) | 19.6 g |
| D) Ammonia persulfate | 4.9 g |
| D) Deionized water | 14.7 g |
| E) Dodecylbenzene sulfonic acid | 3.1 g |
| E) Deionized water | 88.2 g |
| E) Ammonium hydroxide (28%) | 0.5 g |
| F) Methyl methacrylate (MMA) | 318.5 g |
| F) Butyl acrylate (BA) | 140.1 g |
| F) Hydroxypropyl methacrylate (HPMA) | 4.9 g |
| F) Methacrylic acid (MAA) | 2.0 g |
| G) Methyl methacrylate (MMA) | 274.4 g |
| G) Butyl acrylate | 107.8 g |
| G) Glycidyl methacrylate (GMA) | 58.8 g |
| G) Hydroxypropyl methacrylate | 19.6 g |
| G) Methacrylic acid | 9.8 g |
| H) Deionized water | 34.3 g |
| I) Ascorbic acid | 1.0 g |
| I) Deionized water | 9.8 g |
| I) Iron (II) sulfate | 0.00001 g |
| J) t-butyl perbenzoate | 2.5 g |
| J) Deionized water | 9.8 g |
| K) Dimethyl ethanolamine | 4.9 g |
| K) Deionized water | 49 g |

Group A and B were charged into a flask and heated to 80° C. under a nitrogen sparge. Agitation was turned on. The nitrogen sparge was turned off at 75° C. and Group C was added. Next, Group D was added to the flask at 80° C. and held for 15 minutes. Next, Group E was fed over 180 minutes. Next, Group F was fed over 90 minutes at 80° C. Next, Group G was fed over 90 minutes at 80° C. When Group E and Group G were added, the batch was held for 15 minutes. Group H rinsed the pump and pumped the mixture into the reactor. Next, Group I was added and held for 5 minutes. Group J was then added and held for 60 minutes at 80° C. The reactor was then cooled to 40° C. Next, Group K was pumped into the reactor over 30 minutes.

This latex needed an amine to stabilize. The latex particle size was 120 nm. The gel content was 66.6% and the solids content was 44.3%.

Example 3

A large particle size latex (greater than about 300 nm) was prepared by a composite polymerization process with an Aerosol MA-80-I surfactant in the seed stage. The large particle size latex showed improved oven blister resistance at film thicknesses over 7 msi film weight. Glycidyl methacrylate functioned as a crosslinker.

| Acrylate composite latex with a particle size of greater than about 300 nm | Weight |
| --- | --- |
| A) Deionized water | 1029.1 g |
| B) Aerosol MA-80-I | 4.9 g |
| C) Methyl methacrylate (MMA) | 9.8 g |
| C) Butyl acrylate (BA) | 9.8 g |
| D) Ammonia persulfate | 4.9 g |
| D) Deionized water | 14.7 g |
| E) Dodecylbenzene sulfonic acid (DDBSA) | 3.1 g |
| E) Deionized water | 98 g |
| E) Ammonium hydroxide (28%) | 0.5 g |
| F) Methyl methacrylate (MAA) | 252.8 g |

| Acrylate composite latex with a particle size of greater than about 300 nm | Weight |
|---|---|
| F) Butyl acrylate (BA) | 220.5 g |
| F) Hydroxypropyl methacrylate (HPMA) | 4.9 g |
| F) Methacrylic acid (MAA) | 2.0 g |
| G) Methyl methacrylate (MMA) | 200.9 g |
| G) Butyl acrylate (BA) | 191.1 g |
| G) Glycidyl methacrylate (GMA) | 58.8 g |
| G) Hydroxypropyl methacrylate (HPMA) | 19.6 g |
| G) Methacrylic acid (MAA) | 9.8 g |
| H) Deionized water | 34.3 g |
| I) Ascorbic acid | 1.0 g |
| I) Deionized water | 9.8 g |
| I) Iron (II) sulfate | 0.00001 g |
| J) t-butyl perbenzoate | 2.5 g |
| J) Deionized water | 9.8 g |
| K) Dimethyl ethanolamine | 4.9 g |
| K) Deionized water | 49 g |

Group A and B were charged into a flask and heated to 80° C. under a nitrogen sparge. Agitation was turned on. The nitrogen sparge was turned off at 75° C. and Group C was added. Next, Group D was added to the flask at 80° C. and held for 15 minutes. Next, Group E was fed over 180 minutes. Next, Group F was fed over 90 minutes at 80° C. Next, Group G was fed over 90 minutes at 80° C. When Group E and Group G were added, the batch was held for 15 minutes. Group H rinsed the pump and pumped the mixture into the reactor. Next, Group I was added and held for 5 minutes. Group J was then added and held for 60 minutes at 80° C. The reactor was then cooled to 40° C. Next, Group K was pumped into the reactor over 30 minutes at 40° C.

The particle size was 383 nm measured using a Microtrac 53500. The gel content was 85.3%. The solids content was 44.35%.

Example 4

A large particle size latex (greater than about 300 nm) was prepared by a composite polymerization process with surfactant Bisomer PEM6 LD in the seed stage. The large particle size latex showed improved oven blister resistance at film thicknesses over 7 msi. Glycidyl methacrylate functioned as a crosslinker.

| Acrylate composite latex with a particle size of greater than about 300 nm | Weight |
|---|---|
| A) Deionized water | 1024.1 g |
| B) PEM-6 | 2.4 g |
| B) Deionized water | 9.8 g |
| C) Methyl methacrylate (MMA) | 24.5 g |
| C) Butyl acrylate (BA) | 19.6 g |
| D) Ammonia persulfate | 4.9 g |
| D) Deionized water | 14.7 g |
| E) Dodecylbenzene sulfonic acid (DDBSA) | 3.1 g |
| E) Deionized water | 88.2 g |
| E) Ammonium hydroxide (28%) | 0.5 g |
| F) Methyl methacrylate (MAA) | 243.0 g |
| F) Butyl acrylate (BA) | 215.6 g |
| F) Hydroxypropyl methacrylate (HPMA) | 4.9 g |
| F) Methacrylic acid (MAA) | 2.0 g |
| G) Methyl methacrylate (MMA) | 196.0 g |
| G) Butyl acrylate (BA) | 186.2 g |
| G) Glycidyl methacrylate (GMA) | 58.8 g |
| G) Hydroxypropyl methacrylate (HPMA) | 19.6 g |
| G) Methacrylic acid (MAA) | 9.8 g |
| H) Deionized water | 34.3 g |
| I) Ascorbic acid | 1.0 g |
| I) Deionized water | 9.8 g |
| I) Iron (II) sulfate | 0.00001 g |
| J) t-butyl perbenzoate | 2.5 g |
| J) Deionized water | 9.8 g |
| K) Dimethyl ethanolamine | 4.9 g |
| K) Deionized water | 49 g |

Group A and B were charged into a flask and heated to 80° C. under a nitrogen sparge. Agitation was turned on. The nitrogen sparge was turned off at 75° C. and Group C was added. Next, Group D was added to the flask at 80° C. and held for 15 minutes. Next, Group E was fed over 180 minutes. Next, Group F was fed over 90 minutes at 80° C. Next, Group G was fed over 90 minutes at 80° C. When Group E and Group G were added, the batch was held for 15 minutes. Group H rinsed the pump and pumped the mixture into the reactor. Next, Group I was added and held for 5 minutes. Group J was then added and held for 60 minutes at 80° C. The reactor was then cooled to 40° C. Next, Group K was pumped into the reactor over 30 minutes at 40° C.

The particle size was 827 nm measured using a Microtrac S3500. The gel content was 83.3%. The solids content was 44.31%.

Example 5

A large particle size styrene copolymer latex was prepared by a composite polymerization process with an Aerosol MA-80-I surfactant in the seed stage. The latex had a hard core and a soft shell. Glycidyl methacrylate functioned as a crosslinker.

| Styrene copolymer composite latex with a particle size of greater than about 300 nm | Weight |
|---|---|
| A) Deionized water | 1045.0 g |
| B) Aerosol MA-80-I | 5.0 g |
| C) Styrene | 10 g |
| C) Butyl acrylate | 10 g |
| D) Ammonia persulfate | 5.0 g |
| D) Deionized water | 15.0 g |
| E) Dodecylbenzene sulfonic acid (DDBSA) | 3.2 g |
| E) Deionized water | 100.0 g |
| E) Ammonium hydroxide (28%) | 0.5 g |
| F) Styrene | 323.0 g |
| F) Butyl acrylate | 50 g |
| F) Hydroxypropyl methacrylate (HPMA) | 5.0 g |
| F) Methacrylic acid (MAA) | 1.5 g |
| G) Styrene | 155.0 g |
| G) Butyl acrylate | 355.0 g |
| G) Glycidyl methacrylate (GMA) | 60 g |
| G) Hydroxypropyl methacrylate (HPMA) | 20 g |
| G) Methacrylic acid (MAA) | 10 g |
| H) Deionized water | 34.3 g |
| I) Ascorbic acid | 1.5 g |
| I) Deionized water | 14.5 g |
| I) Iron (II) sulfate | 0.00001 g |
| J) t-butyl perbenzoate | 3.6 g |
| J) Deionized water | 14.5 g |
| K) Dimethyl ethanolamine | 5 g |
| K) Deionized water | 50 g |

Group A and B were charged into a flask and heated to 80° C. under a nitrogen sparge. Agitation was turned on. The nitrogen sparge was turned off at 75° C. and Group C was added. Next, Group D was added to the flask at 80° C. and held for 15 minutes. Next, Group E was fed over 180 minutes. Next, Group F was fed over 90 minutes at 80° C. Next, Group G was fed over 90 minutes at 80° C. When Group E and Group G were added, the batch was held for 15 minutes. Group H rinsed the pump and pumped the mixture into the reactor. Group I was added and held for 5 minutes. Group J was then added and held for 60 minutes at 80° C. The reactor was then cooled to 40° C. Next, Group K was pumped into the reactor over 30 minutes at 40° C.

The particle size was 354 nm measured using a Microtrac 53500. The gel content was 68.24%. The solids content was 44.3%.

Example 6

A large particle size latex (greater than about 300 nm) was prepared by a composite polymerization process with an Aerosol MA-80-I surfactant in the seed stage. The latex had a hard core and a soft shell. Glycidyl methacrylate functioned as a crosslinker.

| Acrylate composite latex with a particle size of greater than about 300 nm | Weight |
|---|---|
| A) Deionized water | 1045.1 g |
| B) Aerosol MA-80-I | 5.0 g |
| C) Methyl methacrylate (MMA) | 10.0 g |
| C) Butyl acrylate (BA) | 10.0 g |
| D) Ammonia persulfate | 5.0 g |
| D) Deionized water | 15.0 g |
| E) Dodecylbenzene sulfonic acid (DDBSA) | 3.2 g |
| E) Deionized water | 100 g |
| E) Ammonium hydroxide (28%) | 0.5 g |
| F) Methyl methacrylate (MMA) | 323.0 g |
| F) Butyl acrylate (BA) | 50.0 g |
| F) Hydroxypropyl methacrylate (HPMA) | 5.0 g |
| F) Methacrylic acid (MAA) | 2.0 g |
| G) Methyl methacrylate (MMA) | 155.0 g |
| G) Butyl acrylate (BA) | 355.0 g |
| G) Glycidyl methacrylate (GMA) | 60.0 g |
| G) Hydroxypropyl methacrylate (HPMA) | 20.0 g |

| Acrylate composite latex with a particle size of greater than about 300 nm | Weight |
|---|---|
| G) Methacrylic acid (MAA) | 10.0 g |
| H) Deionized water | 35.0 g |
| I) Ascorbic acid | 1.0 g |
| I) Deionized water | 9.8 g |
| I) Iron (II) sulfate | 0.00001 g |
| J) t-butyl perbenzoate | 2.5 g |
| J) Deionized water | 9.8 g |
| K) Dimethyl ethanolamine | 5.0 g |
| K) Deionized water | 50.0 g |

Group A and B were charged into a flask and heated to 80° C. under a nitrogen sparge. Agitation was turned on. The nitrogen sparge was turned off at 75° C. and Group C was added. Next, Group D was added to the flask at 80° C. and held for 15 minutes. Next, Group E was fed over 180 minutes. Next, Group F was fed over 90 minutes at 80° C. Next, Group G was fed over 90 minutes at 80° C. When Group E and Group G were added, the batch was held for 15 minutes. Group H rinsed the pump and pumped the mixture into the reactor. Next, Group I was added and held for 5 minutes. Group J was then added and held for 60 minutes at 80° C. The reactor was then cooled to 40° C. Next, Group K was pumped into the reactor over 30 minutes at 40° C.

The particle size was 387 nm measured using a Microtrac 53500. The gel content was 74.4%. The solids content was 44.3%.

Example 7

Summary of the Latexes of Examples 1-6

The latexes of Examples 1-6 were all made using a composite polymerization process. The cores of each respective example had a lower ratio of functional monomers (such as hydroxyl and acid monomers) compared to the shells. The shells of each respective example had a higher ratio of functional monomers compared to the cores. The latex of Example 2 had a higher glass transition temperature (Tg). The latex of Example 4 was made by using a Bisomer PEM6 LD seed surfactant. The latex of Example 5 had a different monomer composition. The latexes of Example 5 and Example 6 were latexes which had a hard core and a soft shell.

TABLE 1

(the resins of the examples)

| | 1 | 2 | 3 | 4 | 5 | 6 |
|---|---|---|---|---|---|---|
| Resin | Example 1 | Example 2 | Example 3 | Example 4 | Example 5 | Example 6 |
| HPMA Core/shell ratio (weight) | ¼ | ¼ | ¼ | ¼ | ¼ | ¼ |
| MAA core/shell ratio (weight) | ⅕ | ⅕ | ⅕ | ⅕ | ⅕ | ⅕ |
| Particle size | 137 nm | 133 nm | 396 nm | 827 nm | 354 nm | 375 nm |
| Gel content | 76% | 66.5% | 85% | 83.3% | 68% | 85% |
| Latex stability | stable | stable | stable | not stable | stable | stable |
| Core Fox Tg | 10° C. | 37.3° C. | 10.5° C. | 10° C. | 68.5° C. | 72° C. |
| Shell Fox Tg | 15° C. | 45° C. | 15.4° C. | 15° C. | −12.4° C. | −11.80° C. |

Example 8

Preparation of Coating Compositions

The six coating compositions shown in Table 2 below were formulated with various solvents and wax. The coating formulations are summarized below:

Resin (Example 1-6): 45.3 g
Wax (Lanco Glido 6502 from Lubrizol): 0.8 g
Propylene glycol: 4 g
The final coating solids: 40%.

The coating compositions were coated on 211 TFS substrates and baked for 9 seconds at a metal peak temperature 234° C. The coating weight ranges were from 6.5 to 8 msi. The test results are summarized in Table 2 below. The coating films showed excellent flexibility/adhesion with good cure response at short dwell times on both aluminum and 211 TFS substrates. The latexes of Example 1 and Example 2 had smaller particle sizes and showed some oven blisters on the film. The latex of Example 2 having a higher glass transition temperature showed some cracks on the bead Ericksen cup. The latex of Example 4 had poor water retort performance and the latex settled in a week.

TABLE 2

| Resin | Example 1 | Example 2 | Example 3 | Example 4 | Example 5 | Example 6 |
|---|---|---|---|---|---|---|
| Blush resistance (Immersed 90 mins at 250° F. retort) | <1 | 1-2 | <1 | 3 | 2 | <1 |
| MEK rubs | 50 | 60 | 50 | 20 | 20 | 40 |
| Beaded Ericksen cup | No cracks or fractures | cracks | No cracks or fractures | No cracks or fractures | No cracks or fractures | No cracks or fractures |
| Adhesion | 0 | 0 | 0 | 0 | 0 | 0 |
| Blisters | a few | yes | no | no | no | no |

The compositions of Example 1, 3 and 5 illustrated in Table 2 were coated on 211 TFS substrates to produce 6.5-8 msi film weights. The panels were fabricated into 202 shells on a one-out Shell Press and converted into 202 beverage ends. The ends were evaluated in several tests and the results are summarized in Table 3.

TABLE 3

| | Example 1 | Example 3 | Example 5 |
|---|---|---|---|
| Retort @ 250° F. with water vapor (Enamel Rater) | 4.80 | 2.13 | 3.50 |
| Water retort immersed 90 mins @ 250° F. (Enamel Rater) | 9.87 | 5.50 | 13.37 |
| Metal exposure of copper sulfate 30 minutes blush resistance | | | |
| Panel wall | 0 | 0 | 0 |
| Rivet | 1 | 0 | <1 |
| Score | <1 | 0 | 2 |
| 2% citric acid 60 mins @ 250° F. | | | |
| Blush | 0 | <1 | 1 |
| Blisters | A few | No | No |
| Adhesion | <1 | 0 | 0 |
| Enamel Rater | 41.6 | 9.1 | 145.8 |
| Acidified Coffee 60 mins @ 250° F. | | | |
| Blush | 0 | 0 | 0 |
| Stain | 1 | 1 | 1 |
| Blisters | A few | No | No |
| Adhesion | <1 | 0 | 0 |
| Enamel Rater | 46.2 | 13.4 | 99 |

The invention claimed is:

1. A composite latex emulsion comprising:
    a) a core formed from a first ethylenically unsaturated monomer component, a stabilizer including a strong acid and an initiator; and
    b) a shell formed around the core from a second ethylenically unsaturated monomer component that has a greater number of functional groups that the first ethylenically unsaturated monomer component.

2. The composite latex emulsion of claim 1, wherein the composite latex emulsion further includes a crosslinker.

3. The composite latex emulsion of claim 1, wherein the first ethylenically unsaturated monomer component is at least one of tripropylene glycol di(meth)acrylate, diethylene glycol di(meth)acrylate, ethyl glycol di(meth)acrylate, 1,6-hexanediol di(meth)acrylate, glycerol di(meth)acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, or divinylnaphthalene.

4. The composite latex emulsion of claim 2, wherein the crosslinker includes a phenolic resin, urea-formaldehyde, phenol-formaldehyde, benzoguanamine formaldehyde, or a combination thereof.

5. The composite latex emulsion of claim 1, wherein the first ethylenically unsaturated monomer is more hydrophobic than the second ethylenically unsaturated component.

6. The composite latex emulsion of claim 1, wherein the stabilizer includes dodecylbenzene sulfonic acid.

7. The composite latex emulsion of claim 1, wherein the second ethylenically unsaturated monomer component is at least one of tripropylene glycol di(meth)acrylate, diethylene glycol di(meth)acrylate, ethyl glycol di(meth)acrylate, 1,6-hexanediol di(meth)acrylate, glycerol di(meth)acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, or divinylnaphthalene.

8. A coating composition prepared by a method comprising:
   a) mixing a first ethylenically unsaturated monomer component, a stabilizer, including a strong acid, and an initiator to form an emulsion polymer;
   b) polymerizing the emulsion polymer with a second ethylenically unsaturated monomer component to form a composite latex emulsion that includes a shell surrounding a core, where in the shell has a greater number of functional groups than the core; and
   c) reacting the composite latex emulsion with a neutralizer to form the coating composition.

9. The coating composition of claim 8, wherein the reaction of the composite latex emulsion with the neutralizer is conducted in the presence of a solvent.

10. The coating composition of claim 9, wherein the composite latex emulsion further includes a crosslinker.

11. The coating composition of claim 8, wherein the crosslinker includes a phenolic resin, urea-formaldehyde, phenol-formaldehyde, benzoguanamine formaldehyde, or a combination thereof.

12. The coating composition of claim 8, wherein the first ethylenically unsaturated monomer component is at least one of tripropylene glycol di(meth)acrylate, diethylene glycol di(meth)acrylate, ethyl glycol di(meth)acrylate, 1,6-hexanediol di(meth)acrylate, glycerol di(meth)acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, or divinylnaphthalene.

13. The coating composition of claim 8, wherein the first ethylenically unsaturated monomer component is more hydrophobic than the second ethylenically unsaturated component.

14. The coating composition of claim 8, wherein the coating composition has a gel content greater than about 35.

15. The coating composition of claim 8, wherein the stabilizer includes dodecylbenzene sulfonic acid.

16. The coating composition of claim 8, wherein the neutralizer includes ammonia, dimethylethanolamine, 2-dimethylamino-2-methyl-1-propanol or a mixture thereof.

17. A composite latex emulsion comprising:
   a) a core formed from a first ethylenically unsaturated monomer component, a stabilizer including a strong acid, and an initiator; and
   b) a shell formed around the core from a second ethylenically unsaturated monomer component that has a greater number of functional groups that the first ethylenically unsaturated monomer component, to thereby form a latex particle having a particle size that is greater than about 300 nanometers.

18. The composite latex emulsion of claim 17, wherein the composite latex emulsion further includes a crosslinker.

19. The composite latex emulsion of claim 17, wherein the first ethylenically unsaturated monomer component is at least one of tripropylene glycol di(meth)acrylate, diethylene glycol di(meth)acrylate, ethyl glycol di(meth)acrylate, 1,6-hexanediol di(meth)acrylate, glycerol di(meth)acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer, a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, or divinylnaphthalene.

20. The composite latex emulsion of claim 17, wherein the second ethylenically unsaturated monomer component is at least one of tripropylene glycol di(meth)acrylate, diethylene glycol di(meth)acrylate, ethylene glycol di(meth)acrylate, 1,6-hexanediol di(meth)acrylate, glycerol di(meth)acrylate, glycidyl methacrylate, 1,4-butanediol di(meth)acrylate, hydroxypropyl (meth)acrylate, (meth)acrylic acid, a vinyl monomer, an acrylic monomer, an allylic monomer, an acrylamide monomer, a vinyl ester, a vinyl halide, a vinyl aromatic hydrocarbon, a vinyl aliphatic hydrocarbon monomer a vinyl alkyl ether, an acrylic monomer, 1,3-butylene glycol (meth)acrylate, polyalkylene glycol di(meth)acrylate, diallyl phthalate, trimethylolpropane tri(meth)acrylate, divinylbenzene, divinyltoluene, trivinylbenzene, or divinylnaphthalene.

21. The composite latex emulsion of claim 17, wherein the crosslinker includes a phenolic resin, urea-formaldehyde, phenol-formaldehyde, benzoguanamine formaldehyde, or a combination thereof.

22. The composite latex emulsion of claim 17, wherein the first ethylenically unsaturated monomer is more hydrophobic than the second ethylenically unsaturated component.

23. The composite latex emulsion of claim 17, wherein the stabilizer includes dodecylbenzene sulfonic acid.

* * * * *